United States Patent [19]

Katayama

[11] 4,374,427
[45] Feb. 15, 1983

[54] DIVISOR TRANSFORM TYPE HIGH-SPEED ELECTRONIC DIVISION SYSTEM

[76] Inventor: Aisuke Katayama, 2-47, Kawamotomutsumicho, Akita-shi, Akita, Japan

[21] Appl. No.: 194,838

[22] Filed: Oct. 7, 1980

Related U.S. Application Data

[63] Continuation of Ser. No. 179,702, Aug. 20, 1980, abandoned.

[30] Foreign Application Priority Data

Aug. 25, 1979 [JP] Japan .............................. 54-107670

[51] Int. Cl.³ .......................... G06F 7/52; G06F 7/544
[52] U.S. Cl. .................................... 364/761; 364/764
[58] Field of Search ................ 364/761, 764, 765, 766

[56] References Cited

U.S. PATENT DOCUMENTS 3,633,018  1/1972  Ling ................................. 364/765
3,736,413  5/1973  Ferguson ......................... 364/761
3,828,175  8/1974  Amdahl et al. ................... 364/765

Primary Examiner—Jerry Smith
Attorney, Agent, or Firm—Laff, Whitesel, Conte & Saret

[57] ABSTRACT

An electronic network division system is operated responsive to signals representing divisors and dividends. An input divisor signal is divided into a given number (N) of integers, the number (N) being selected on a basis of a desired accuracy index. Each divided signal is a transform of a divisor which is read from one of (N) number of read-only memories, there being a separate read-only memory for each of the given number (N) of integers. Each of said given number of transformed divisor signals is separately multiplied by a dividend signal to produce (N) number of multiplication products. Each of these multiplication product signals is divided into high and low subproduct signals and applied to a corresponding one of (N) number of adders. A high subproduct signal from one multiplication product is added in the adding means to a low subproduct signal from another multiplication product.

17 Claims, 4 Drawing Figures

DIVISOR TRANSFORM TYPE HIGH-SPEED ELECTRONIC DIVISION SYSTEM

This is a continuation of my application Ser. No. 179,702, filed Aug. 20, 1980 and now abandoned.

This invention relates to division systems and, more particularly to extremely fast and asynchronous electronic division systems, especially systems using binary numbering.

BACKGROUND OF THE INVENTION

Normally, a division process can be described to a succession of subtractions and shifts, in much the same manner that multiplication can be implemented by a series of additions and shifts.

The conventional method of division may be expressed as being a number of formal steps. Manually, the divisor and dividend are compared, the divisor is multiplied by a first quotient digit, and a subtraction is made. Then, the dividend is shifted one place to the left after each subtraction is completed.

Electronically, if the divisor is equal to or less than a dividend, a "1" is entered in the quotient and the divisor is subtracted from the dividend. If the divisor is larger than the dividend, a zero is subtracted and a "0" is entered in the quotient. The process repeats with the modified or partial dividend. The procedure terminates when a correct number of places has been generated in the quotient. Thus, it is necessary to perform may subtractions and left shifts.

A conventional binary division system comprises a register that holds the divisor. A shift register contains the dividend or the partial dividend. The quotient is entered on a one bit-by-bit basis, as clock pulses appear to control a subtractor and a comparator circuit.

It can be expensive to include a special comparator in a division logic system. Consequently, many computers perform the comparison operation by subtracting the divisor from the dividend. The original dividend must be restored by the subsequent addition of the divisor, if the divisor is larger than the dividend, as can be seen from the above description.

This method is called "restoring division." Obviously, it requires a long time to complete a division by this method, as compared to the time required for using the basic technique. To speed up the execution time, a method may be used so that, if a test subtraction gives a negative remainder, it is nullified by adding back half the divisor in the next arithmetic step. This method is called "non-restoring division."

A synchronous division system requires a series of subtractions and shifts, so that it is indispensable to use a fast clock rate circuitry in order to speed up the division system. However, a fast bit shift causes a bit transfer error in the shift registers that often results in an erroneous quotient.

An iterative division using only multiplication had been proposed by Wallace (a suggestion for a fast multiplier is found in the IEEE Transactions; Electronic Computers, 1964, EC 13, 14–17). In this approach, the quotient is generated by multiplying the dividend by the reciprocal of the divisor which is produced by iterative multiplications, starting with an initial guess as to the approximation of the reciprocals. In this approach, the iteration of the multiplication is indispensable. Therefore, there is a slowdown of the division time.

The invention disclosed herein overcomes these and other defects of the prior art technologies relating to division systems and contributes a remarkable improvement of the structure and performance of the division system.

SUMMARY OF THE INVENTION

Therefore, an object of the present invention is to overcome the disadvantages and limitations of prior division systems and to provide new and improved division systems.

In computing machinery, the arithmetic operations are performed by hardware operating under the control of clock pulses. That is, multiplication and division are performed by a series of shifts and other operations. A calculation (such as division) requires many repetitions of shifts and subtractions. Therefore, the bits (in other words, the signals carrying a value of either "1" or "0") are forced through the digital circuitry at a very high speed, and the repetition rate becomes high. As a result, there are many bit defect errors growing out of such a high-speed operation.

Accordingly, another object of the invention is to provide a plurality of transform ROM's for converting the divisions to multiple multiplications which are performed concurrently. A further object is to provide adder chains for obtaining a quotient from the products resulting from successive multiplications.

The time required to complete a multiplication is much smaller than the time required to complete a division. Therefore, the invention reduces the time required to complete a division through use of transform type division system.

Other objects and aspects of the invention will become apparent from the following description of two preferred embodiments with the reference to an exemplary numerical transform Table and to the drawings, wherein.

DESCRIPTION OF THE PREFERRED EMBODIMENTS

Figure 1:
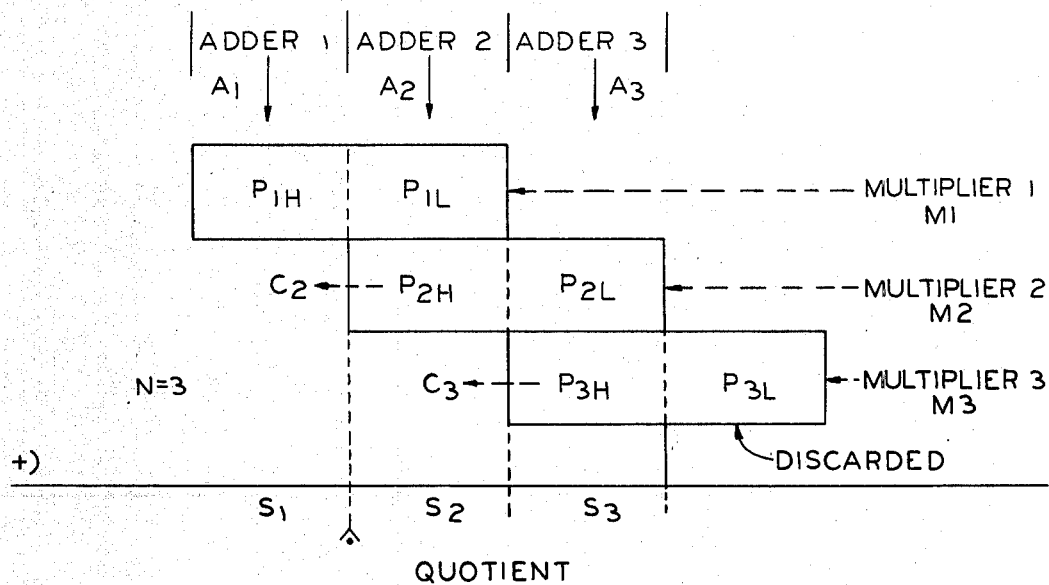
FIG. 1 is a performance diagram illustrating the basic process of the inventive network.

The inventive binary division system performs the division of two integers very quickly. The degree of quotient accuracy can be specified for the circuit composed of divisor transform devices and of multipliers. Further, one array of adders may appropriately be connected to the outputs of precedent multipliers.

The quotient is obtained in the form of a fixed point binary number delivered on a sum terminal array of the adders.

A short account of the binary number system will be given first in order to clarify the basic principle of the inventions.

In the binary system, an integer X is represented by $$X = b_n b_{n-1} \ldots b_0 \tag{1}$$

that is, by a string of digits $b_i$ chosen from 0, 1. The value of X is given by $$X = b_n 2^n + b_{n-1} 2^{n-1} \ldots + b_0 2^0 \quad (2)$$

wherein the number 2 is called the "radix" or base of the binary number system.

The conventional decimal number system uses a radix 10, so that any integer is represented as a string of digits 0, 1, 2, ... 9. The hexadecimal system uses a radix 16 ($=2^4$), so that any integer is represented as a string of digits 0, 1, 2, ... 9, A, B, C, D, E, F. The digit of the binary system is called a "bit." Therefore, each digit of the hexadecimal system is represented by a four-digit binary word or string, as follows: 0=0000, 1=0001, 2=0010, 3=0011, 4=0100, 5=0101, 6=0110, 7=0111, 8=1000, 9=1001, A=1010, B=1011, C=1100, D=1101, E=1110, F=1111. By way of example, in the hexadecimal system, a number represented by AF87 is the same as the number 1010111110000111 in the binary system, and vice versa.

Let $h_i$ be a digit in the hexadecimal notation. Then, an integer X (represented by $h_n h_{n-1} \ldots h_0$) is equal to $$X = h_n 2^{4n} + h_{n-1} 2^{4n-4} + \ldots h_0 2^0 \quad (3)$$

A fractional number of the binary number system is expressed as $.b_{-1} b_{-2} b_{-3} \ldots b_{-m}$. The first dot in this notation is a decimal point which is not indicated in the digital circuitry; however, it can be specified by the bit position of a register that stores the fraction number.

Let the binary fraction be F, then F can be written as:

$$F = b_{-1} 2^{-1} + b_{-2} 2^{-2} + b_{-3} 2^{-3} + \ldots + b_{-m} 2^{-m}. \quad (4)$$

An infinite fraction in the base 2 is an infinite sequence of 0 or 1, say $.b_{-1} b_{-2} b_{-3} \ldots$, and a finite fraction is a finite sequence of 0 or 1, say $.b_{-1} b_{-2} \ldots b_{1 m}$.

We will first consider two h-bit integers, say, X, Y. Let X be a dividend, and Y be a divisor. The quotient X/Y is derived by first inverting the divisor Y, and then a fraction is generated as follows:

$$1/Y = .b_{-1} b_{-2} b_{-3} \ldots b_{-h} \ldots \quad (5)$$

Therefore, $$X/Y = X(.b_{-1} b_{-2} \ldots b_{-h} \ldots) \quad (6)$$

This equation indicates that the quotient X/Y can be obtained in principle by a multiplication of the integer X and the fraction 1/Y represented by $.b_{-1} b_{-2} \ldots$.

In many cases, the bit string of the divisor becomes an infinite fraction. Therefore, a truncation of the string must be made in order to conform to the limited bit length of the digital circuitry.

If h is the bit length of the dividend and the divisor and if a finite length fraction is used, the string of digits is truncated at the $2^{-h-1}$ bit position. The quotient X/Y is approximated such that $$X/Y = X(.b_{-1} \ldots b_{-h}) = q_{h-1} q_{h-2} \ldots q_0 . q_{-1} q_{-2} \cdot \ldots q_{-h} \quad (7)$$

where $q_i$ represents a binary digit of the approximated quotient. A decimal point . is shown for reference only.

However, this approximateion is very bad, as can be seen from the following analysis:

X is an integer of h-bit length, $$X = b_{h-1} 2^{h-1} + \ldots b_0 2^0$$

Therefore, the approximate quotient including the first truncated bit is $$X(b_{-1} 2^{-1} + \ldots \\ + b_{-h} 2^{-h} + b_{-h-1} 2^{-h-1}) = (b_{h-1} 2^{h-1} + \ldots \\ + b_0 2^0)(b_{-1} 2^{-1} + \ldots b_{-h} 2^{-h} + b_{-h-1} 2^{-h-1})$$

The term of the maximum truncate error is:

$$b_{h-1} \times b_{-h-1} (2^{h-1} \times 2^{-h-1}) = b_{h-1} \times b_{-h-1} 2^{-2}$$

Therefore, the truncated error appears in the $2^{-2}$ bit position. Further, when all truncated terms are 1, a carryout affects the term $b_{-h} 2^{-h}$, so that $2^{-1}$ bit position is also affected.

Therefore, the quotient indicated by the left side of equation (7) is correct for only the integral portion of the quotient.

This is an insufficient accuracy; therefore, an integer N is introduced such that N>1. This figure "N" is called the "accuracy index."

Then, the truncated reciprocal is $$1/Y = .b_{-1} b_{-2} \ldots b_{-h} \ldots b_{-2h} \ldots b_{-Nh} \quad (8)$$

However, this is a fraction number, so that a number $2^{Nh}/Y$ is introduced which is always an integer when Y is an h-bit integer, because Y is less than $2^h$. Approximately the following relationship holds:

$$2^{Nh}/Y = b_{-1} b_{-2} b_{-3} \ldots b_{-h} \ldots b_{-Nh} = G \quad (9)$$

wherein $b_{-1} b_{-2} \ldots b_{-Nh}$ is an integer of Nh bit length. It is also considered as a bit string, designated "G." A string is a row or array of digits wherein all members are of the same kind. For instance, the two numbers 1101, AD2 are a bit string, and a hexadecimal string, respectively. However, the number 11.01 is not a string because the decimal (.) is included. If $g_1 = b_{-1} \ldots b_{-h}, g_2 = b_{-h-1} \ldots b_{-2h} \ldots g_N = b_{-(N-1)h-1} \ldots b_{-Nh}$; then, G is equal to $g_1 g_2 \ldots g_N$ and $g_1, g_2, ., g_N$, which are called "substrings" of G. Then G can be written as $$G = g_1 g_2 \ldots g_N \quad (10)$$

Therefore, there is a one-to-one correspondence between a divisor Y (which is an integer of h-bit length) and an integer G (of Nh-bit length), according to the relationship of equation (9). In other words, an h-bit string Y is transformed into an Nh-bit string G. The string G is called a "divisor transform of Y."

When h is a multiple of four, 4-bit strings, say, $b_{-1} b_{-2} b_{-3} b_{-4}$, can be represented by equivalent one-digit strings, say $h_{-1}$, and so on.

Then, the transform relationship can be written as:

$$2^{Nh}/Y \approx h_{-1} h_{-2} \ldots h_{-Nh/4} = G = g_1 g_2 \ldots g_N \quad (11)$$

Thus, the quotient X/Y is obtained, as follows:

$$X/Y \approx X(h_{-1} h_{-2} \ldots h_{-Nh/4}) \times 2^{-Nh} = X(g_1 g_2 \ldots g_N) \times 2^{-Nh} \quad (12)$$

Therefore, the division becomes a multiplication such that $X \times (h_{-1} h_{-2} \ldots h_{-Nh/4})$. However, the bit length of these transformed numbers is too large either to be manipulated in an h bit by an h-bit multiplier, or to be stored in conventional ROM's.

In the following disclosure, the basic principles of the inventions are explained under an assumption that h is equal to 8; however, similar explanations can also be applied by slight modifications to another case, as where h is equal to any suitable multiple of 4, for example. The right-hand term of equation (12) is the approximate quotient for X/Y, say Q. One digit $h_{-1}$ of the hexadecimal system is equal to a four-bit binary string; an eight-bit binary string converts to a two-digit string of the hexadecimal system.

Dividing the hexadecimal-digit string in equation (12) into a two-digit string, in order to conform to the case of h=8, the approximate quotient Q can be expressed as:

$$Q=(X)(h_{-1}h_{-2})2^{-h}+(X)(h_{-3}h_{-4})2^{-2h}+\ldots(X) \\ (h_{-(Nh/4)+1}h_{-Nh/4}) \\ 2^{-Nh}=(X)g_1 2^{-h}+(X)g_2 2^{-2h}+\ldots+(X)g_N 2^{-Nh} \quad (13)$$

If h=16, the expansion takes the form $(X)(h_{-1}h_{-2}h_{-3}h_{-4})2^h+\ldots$.

The multiplications such as $(X)\times(h_{-i}h_{-i-1})$; where $i=1,\ldots Nh/4-1$ are performed in h-by-h bit multipliers, generating 2 h-bit products $P_i$ ($i=1,\ldots N$), respectively.

Then, the approximate quotient Q is given as follows:

$$Q=P_1 2^h + P_2 2^{2h} + P_3 2^{3h} + \ldots + P_N 2^{-Nh} \quad (14)$$

Therefore, Q can be obtained by direct additions of 2 h-bit products using 2 h-bit adders train. However, when h=8, N adders (each of 16-bit length) are required and they must be connected consecutively in cascade, so that the total delay time is too long.

One freature of the preferred embodiments of the invention comes from the rearrangement of the equation (14).

When an h-by-h bit multiplier $M_i$ generates the product $P_i$ (which is a 2 h-bit integer), the higher and lower half bit portions are obtained separately; or, they can be separated from the product. In the product $P_i$, the higher half bits portion $P_{iH}$, and the lower half bit portion $P_{iL}$ are related as follows:

$$P_i = P_{iH} 2^h + P_{iL} \quad (15)$$

By substituting equation (15) into equation (14), an important relationship is obtained, as stated:

$$Q=P_{1H}+(P_{1L}+P_{2H})2^{-h}+(P_{2L}+P_{3H})2^{-2h}+\ldots \\ +(P_{(N-1)L}+P_{NH})2^{-(N-1)h}+P_{NL}2^{-Nh} \quad (16)$$

FIG. 1 shows N adders (three in this example), each of h-bit length, for obtaining the approximate product Q. In FIG. 1, the accuracy index is N=3. This FIG. 1 uses three h-by-h bit multipliers M1, M2, M3 and three h-bit adders A1, A2, A3. The distinctive feature is that, in the middle adder A2, the $P_{1L}$ of M1 is applied to the augend terminal, and the $P_{2H}$ of M2 is applied to the addend terminal of the same adder A2.

The middle adder A2 performs an addition $P_{2H}+P_{1L}+c_3$ (mod $2^h$), where $c_3$ is a carryout bit from the adder A3, which provides a sum $S_2$ and gives the most significant h bits of the fractional portion of the quotient Q.

The first adder A1 performs an addition $P_{1H}+c_2$ (mod $2^h$), where $c_2$ is a carry-out bit from the adder A2, and provides a sum $S_1$ which gives the integral h-bit portion of the quotient Q.

The third adder A3 performs an addition $P_{2L}+P_{3H}$ (mod $2^h$), and provides sum $S_3$ which gives the least significant h bits of the fraction portion of the quotient Q.

The lower half bit portion $P_{3L}$ of the product of the multiplier M3 provides incorrect bits for the approximate quotient Q due to a truncation that will be discussed later, so that the last portion of the quotient must be discarded.

Therefore, the correct quotient $Q_c$ up to (N−1)h bits of its fraction portion is given by $$Q=S_1.S_2 S_3 \ldots S_N \quad (17)$$

For instance, if N=3, h=8, $Q=S_1.S_2 S_3$, a correct quotient has up to a 16-bit fraction position.

In the equation (17), $S_1, S_2, S_3, \ldots S_N$ are given by:

$$S_1 = P_{1H} + c_2 \pmod{2^h} \\ S_2 = P_{1L} + P_{2H} + c_3 \pmod{2^h} \\ S_3 = P_{2L} + P_{3H} + c_4 \pmod{2^h} \\ \ldots \\ S_N = P_{(N-1)L} + P_{NH} \pmod{2^h} \quad (18)$$

Let X, Y be an h-bit dividend and an h-bit divisor, and let a divisor transform number for Y be G; then, G is given by a bit string, as follows:

$$G = b_{-1} b_{-2} \ldots b_{-h} \ldots b_{-Nh} \quad (19)$$

or G is given by a hexadecimal digit string when h is a multiple of 4, say $$G = h_{-1} h_{-2} \ldots h_{-h/4} \ldots h_{-Nh/4} \quad (20)$$

wherein $b_{-i}$ is a binary digit (bit), $h_{-i}$ is a hexadecimal digit.

If h=8, G is divided into substrings $g_1, g_2, g_N$ such as:

$$G = g_1 g_2 \ldots g_N \\ g_1 = h_{-1} h_{-2}, g_2 = h_{-3} h_{-4}, \ldots \\ g_N = h_{-Nh/4+1} h_{-Nh/4}. \quad (21)$$

Each of the multipliers M1, M2, M3, ... MN performs the operation indicated by the following equations:

$$M1: X \times g_1 = P_{1H} P_{1L} \\ M2: X \times g_2 = P_{2H} P_{2L} \\ M3: X \times g_3 = P_{3H} P_{3L} \\ \ldots \\ MN: X \times g_N = P_{NH} P_{NL} \quad (22)$$

A distinctive feature of the invention is that these multiplications are performed simultaneously. Then, the products are used as the inputs to the chain of adders A1, A2, A3, ... AN for providing a sum bit strings such as $S_1 S_2 \ldots S_N$ which is no other than an approximate quotient giving the correct digits up to the (N−1)h th fraction digit position.

ERROR ANALYSIS OF THE APPROXIMATE QUOTIENT

A dividend X and a divisor Y are assumed as being expressed in binary word lengths of h digits, and an inverse of Y that is a fraction which is generally represented by an infinite digits string.

In this invention, a prescribed integer number N is introduced as the "accuracy index" of the quotient.

A divisor transform number is defined as a finite-digit string that is equal to the inverse of the divisor, when it is truncated at the Nh th digit position.

X and 1/Y can be expressed as $$X = a_{h-1}2^{h-1} + \ldots + a_0 2^0 \qquad (23)$$
$$1/Y = b_{-1}2^{-1} \ldots + b_{-Nh}2^{-Nh} + b_{-Nh-1}2^{-Nh-1} + \ldots$$

Therefore, the most significant term of the discarded portion of the inverse of the divisor is $b_{-Nh-1}2^{-Nh-1}$.

By the multiplication of X and 1/Y, the product (that is, the quotient) is generated. The most significant term that contains the discarded portion is given by:

$$a_{n-1}2^{h-1} \times b_{-Nh-1}2^{-Nh-1},$$

that is, $$(a_{n-1} \times b_{-Nh-1})2^{-(N-1)h-2} \qquad (24)$$

Therefore, the $(N-1)h+2$ th bit position is the first bit position that is affected by the discarded portion. The worst case is that the coefficients of the following terms are all one. In this worst case, the value of the quotient due to the truncation is given by:

$$(a_{n-1} \times b_{-Nh-1})2^{-(N-1)h-2}(1+\tfrac{1}{2}+(\tfrac{1}{2})^2+\ldots$$
$$) = (a_{n-1} \times b_{-Nh-1})2^{-(N-1)-1} \qquad (25)$$

Thus, the $(N-1)h+1$ th bit position of the fraction portion of the quotient may be affected by the truncation.

Consequently, the approximate quotient generated by the divisor transform number method forms correct digits ending at the $(N-1)h$ th bit fraction portion.

Therefore, by specifying the accuracy index number N, we can preset the accuracy of the quotient issued from the division system which is the preferred embodiment of the invention.

DETAILED DESCRIPTIONS OF THE PREFERRED EMBODIMENTS

A fast and asynchronous division system for binary words, of h-bit length, is enbodied according to the basic mathematical exposition presented heretofore.

The preferred embodiment of the invention provides an h-bit-by-h-bit divisor wherein both a dividend X and a divisor Y are positive binary words of h-bit length, respectively.

Although h may be any integer, a multiple of 4 is preferred, because it conforms with the electronic digital integrated circuit (IC) components which are easily available, especially where h=8. Therefore, h is henceforth assumed to be 8.

The division system is a combination of three subsystems. The first subsystem is composed of an array of ROM's. The second subsystem is composed of multipliers. Finally, the third subsystem is composed of a cascaded chain of adders.

The accuracy index N is selected to specify the length of the quotient which is accurate. The basic number of the components in each subsystem is then equal to N. For instance, if N is selected as "3," the first, second and third subsystems contain three ROM's, three multipliers, and three adders, respectively. In the description which follows, the example of N=3 will be explained for easy understanding.

THE FIRST SUBSYSTEM—STRUCTURE AND OPERATION

Figure 2:
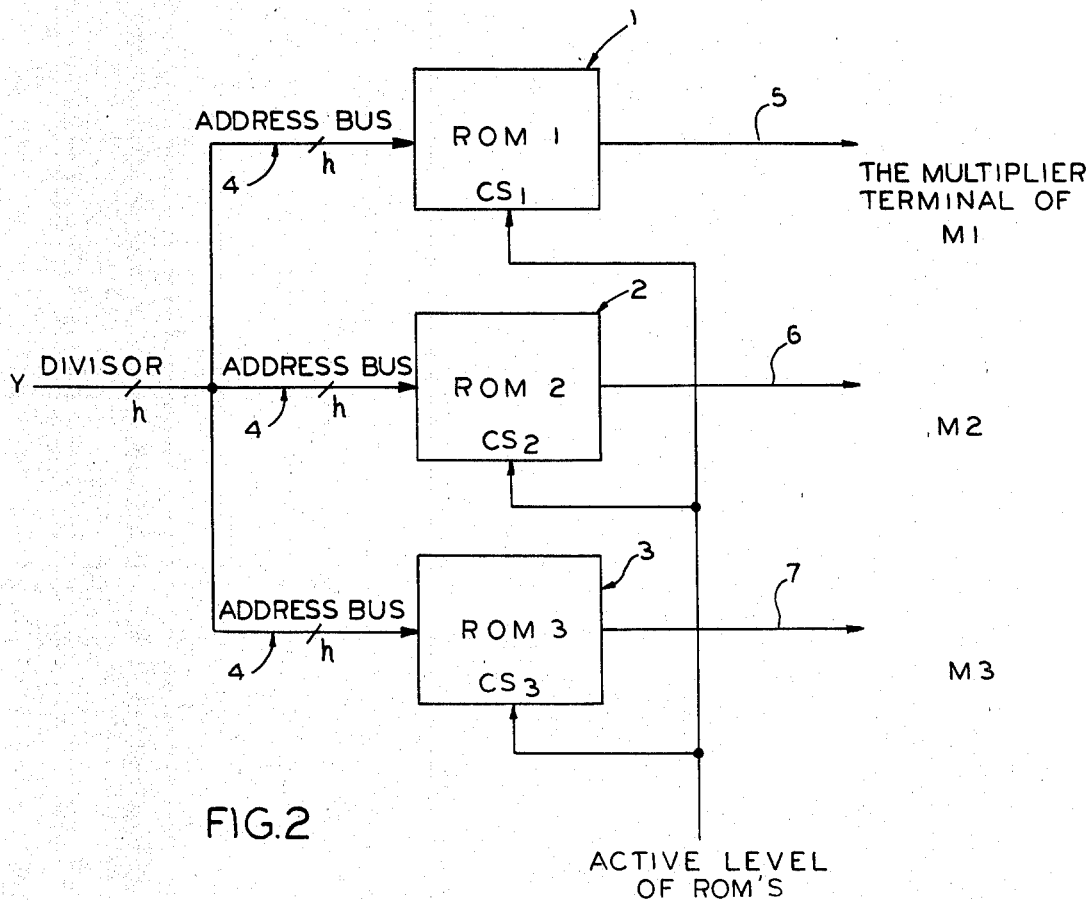
FIG. 2 shows a detailed block diagram of divisor transform devices and the connection between them.

The subsystem of FIG. 2 performs a transformation of the divisor.

In greater detail, the structure of the divisor transform subsystem (FIG. 2) has three ROM's 1, 2, 3 tailored to Table 1, as described above. The address terminals of these ROM's are connected, in common, to an address line 4 composed of h-bit lines, each line of which carries one digit of the h-bit length binary word divisor Y. The outputs of these three ROM's are pulled out separately on buses 5, 6, 7, and are connected to the respective multiplier input terminals of multipliers M1, M2, M3, that operate concurrently and independently. The chip select terminals CS1, CS2 and CS3 of these ROM's are connected in common and held at the active level of the ROM's, while the division system is operating. Therefore, when a divisor Y of h-bit length is applied simultaneously to the address terminals of ROM1, ROM2 and ROM3, each of the substrings $g_1$, $g_2$ and $g_3$ is generated concurrently after an addressing delay caused by the access time of the ROM's.

The ROM1, ROM2, ROM3 are constructed or preprogrammed by storing the substrings $g_1$, $g_2$, $g_3$ at the address specified by the corresponding divisor Y, respectively. This programming procedure is performed according to the following Table 1 in an example where h=8, N=3. For instance, if Y is 14 (00001110), then from the Table, $g_1=12$, $g_2=49$, $g_3=24$. Therefore, the values 12, 49, 24 must be stored at the address OE (the hexadecimal symbol for the decimal number "14") of ROM1, ROM2, ROM3.

Each of these ROM's may be the same type, using a $2^8$ address (256 words) and an 8-bit output. Various ROM's that satisfy this specification are readily available on the open market, one of which is designated as type SN 74S471 (Texas Instruments) and which has an access time of 50 ns.

The ROM's are tailored as taught in Table 1 and operate as the divisor transform devices. Therefore, when an h-bit divisor Y (h=8; N=3) is applied as an address to the ROM's, the ROM1 provides the first substring $g_1$, the ROM2 provides the second substring $g_2$, and the ROM3 provides the third substring $g_3$. The divisor Y and the string G uniquely correspond to the substrings $g_1 g_2 g_3$, that is, $G = g_1 g_2 g_3$.

It should be mentioned that a different divisor Y' might have some of the same substrings as the divisor Y has, say, substring $g_1$, but the combined sequence of substrings $g_1 g_2 g_3 = G$ is unique to Y.

As explained in equation (9), or in equations (19), (20), (21), the divisor Y is transformed to a unique string G. In other words, the bits divisor is an h-bit string which is converted to a unique 3h-bit string G (N=3).

Table 1 is a divisor transform Table in which a divisor integer of eight bits (h=8) corresponds to a divisor integer transform string of 24 bits. The divisor Y is an 8-bits integer; however, it is expressed as a decimal number, for easy reference. The converted string G is a 24-bit integer which is expressed as hexadecimal digit string. However, this string is too long to be processed directly by digital circuitry. Therefore, it is divided to three substrings $g_1, g_2, g_3$, each of which has an 8-bit length and they are shown as hexadecimal digits in Table 1. Each substring is an eight-bit integer, where (N=3). In Table 1, the first substring is identified by $g_1$, the second by $g_2$, and the third by $g_3$.

TABLE 1

| Divisor | g1 Sub-String | g2 Sub-String | g3 Sub-String | Divisor | g1 Sub-String | g2 Sub-String | g3 Sub-String | Divisor | g1 Sub-String | g2 Sub-String | g3 Sub-String | Divisor | g1 Sub-String | g2 Sub-String | g3 Sub-String |
|---|---|---|---|---|---|---|---|---|---|---|---|---|---|---|---|
| 1 | 01 | 00 | 00 | 26 | 09 | D8 | 9D | 155 | 01 | A6 | D0 | 180 | 01 | 6C | 16 |
| 2 | 80 | 00 | 00 | 27 | 09 | 7B | 42 | 156 | 01 | A4 | 1A | 181 | 01 | 6A | 13 |
| 3 | 55 | 55 | 55 | 28 | 09 | 24 | 92 | 157 | 01 | A1 | 6D | 182 | 01 | 68 | 16 |
| 4 | 40 | 00 | 00 | 29 | 08 | D3 | DC | 158 | 01 | 9E | C8 | 183 | 01 | 66 | 1E |
| 5 | 33 | 33 | 33 | 30 | 08 | 88 | 88 | 159 | 01 | 9C | 2D | 184 | 01 | 64 | 2C |
| 6 | 2A | AA | AA | 31 | 08 | 42 | 10 | 160 | 01 | 99 | 99 | 185 | 01 | 62 | 3F |
| 7 | 24 | 92 | 49 | 32 | 08 | 00 | 00 | 161 | 01 | 97 | 0E | 186 | 01 | 60 | 58 |
| 8 | 20 | 00 | 00 | 33 | 07 | C1 | F0 | 162 | 01 | 94 | 8B | 187 | 01 | 5E | 75 |
| 9 | 1C | 71 | C7 | 34 | 07 | 87 | 87 | 163 | 01 | 92 | 0F | 188 | 01 | 5C | 98 |
| 10 | 19 | 99 | 99 | 35 | 07 | 50 | 75 | 164 | 01 | 8F | 9C | 189 | 01 | 5A | C0 |
| 11 | 17 | 45 | D1 | 36 | 07 | 1C | 71 | 165 | 01 | 8D | 30 | 190 | 01 | 58 | ED |
| 12 | 15 | 55 | 55 | 37 | 06 | EB | 3E | 166 | 01 | 8A | CB | 191 | 01 | 57 | 1E |
| 13 | 13 | B1 | 3B | 38 | 06 | BC | A1 | 167 | 01 | 88 | 6E | 192 | 01 | 55 | 55 |
| 14 | 12 | 49 | 24 | 39 | 06 | 90 | 69 | 168 | 01 | 86 | 18 | 193 | 01 | 53 | 90 |
| 15 | 11 | 11 | 11 | 40 | 06 | 66 | 66 | 169 | 01 | 83 | C9 | 194 | 01 | 51 | D0 |
| 16 | 10 | 00 | 00 | 41 | 06 | 3E | 70 | 170 | 01 | 81 | 81 | 195 | 01 | 50 | 15 |
| 17 | 0F | 0F | 0F | 42 | 06 | 18 | 61 | 171 | 01 | 7F | 40 | 196 | 01 | 4E | 5E |
| 18 | 0E | 38 | E3 | 43 | 05 | F4 | 17 | 172 | 01 | 7D | 05 | 197 | 01 | 4C | AB |
| 19 | 0D | 79 | 48 | 44 | 05 | D1 | 74 | 173 | 01 | 7A | D2 | 198 | 01 | 4A | FD |
| 20 | 0C | CC | CC | 45 | 05 | B0 | 5B | 174 | 01 | 78 | A4 | 199 | 01 | 49 | 53 |
| 21 | 0C | 30 | C8 | 46 | 05 | 90 | B2 | 175 | 01 | 76 | 7D | 200 | 01 | 47 | AE |
| 22 | 0B | A2 | E8 | 47 | 05 | 72 | 62 | 201 | 01 | 46 | 0C | 229 | 01 | 1E | 2E |
| 23 | 0B | 21 | 64 | 48 | 05 | 55 | 55 | 202 | 01 | 44 | 6F | 230 | 01 | 1C | F0 |
| 24 | 0A | AA | AA | 49 | 05 | 39 | 78 | 203 | 01 | 42 | D6 | 231 | 01 | 1B | B4 |
| 25 | 0A | 3D | 70 | 50 | 05 | 1E | B8 | 204 | 01 | 41 | 41 | 232 | 01 | 1A | 7B |
| 51 | 05 | 05 | 05 | 76 | 03 | 5E | 50 | 205 | 01 | 3F | B0 | 233 | 01 | 19 | 45 |
| 52 | 04 | EC | 4E | 77 | 03 | 53 | 1D | 206 | 01 | 3E | 22 | 234 | 01 | 18 | 11 |
| 53 | 04 | D4 | 87 | 78 | 03 | 48 | 34 | 207 | 01 | 3C | 99 | 235 | 01 | 16 | E0 |
| 54 | 04 | BD | A1 | 79 | 03 | 3D | 91 | 208 | 01 | 3B | 13 | 236 | 01 | 15 | B1 |
| 55 | 04 | A7 | 90 | 80 | 03 | 33 | 33 | 209 | 01 | 39 | 91 | 237 | 01 | 14 | 85 |
| 56 | 04 | 92 | 49 | 81 | 03 | 29 | 16 | 210 | 01 | 38 | 13 | 238 | 01 | 13 | 5C |
| 57 | 04 | 7D | C1 | 82 | 03 | 1F | 38 | 211 | 01 | 36 | 98 | 239 | 01 | 12 | 35 |
| 58 | 04 | 69 | EE | 83 | 03 | 15 | 97 | 212 | 01 | 35 | 21 | 240 | 01 | 11 | 11 |
| 59 | 04 | 56 | C7 | 84 | 03 | 0C | 30 | 213 | 01 | 33 | AE | 241 | 01 | 0F | EF |
| 60 | 04 | 44 | 44 | 85 | 03 | 03 | 03 | 214 | 01 | 32 | 3E | 242 | 01 | 0E | CF |
| 61 | 04 | 32 | 5C | 86 | 02 | FA | 0B | 215 | 01 | 30 | D1 | 243 | 01 | 0D | B2 |
| 62 | 04 | 21 | 08 | 87 | 02 | F1 | 49 | 216 | 01 | 2F | 68 | 244 | 01 | 0C | 97 |
| 63 | 04 | 10 | 41 | 88 | 02 | E8 | BA | 217 | 01 | 2E | 02 | 245 | 01 | 0B | 7E |
| 64 | 04 | 00 | 00 | 89 | 02 | E0 | 5C | 218 | 01 | 2C | 9F | 246 | 01 | 0A | 68 |
| 65 | 03 | F0 | 3F | 90 | 02 | D8 | 2D | 219 | 01 | 2B | 40 | 247 | 01 | 09 | 53 |
| 66 | 03 | E0 | F8 | 91 | 02 | D0 | 2D | 220 | 01 | 29 | E4 | 248 | 01 | 08 | 42 |
| 67 | 03 | D2 | 26 | 92 | 02 | C8 | 59 | 221 | 01 | 28 | 8B | 249 | 01 | 07 | 32 |
| 68 | 03 | C3 | C3 | 93 | 02 | C0 | B0 | 222 | 01 | 27 | 35 | 250 | 01 | 06 | 24 |
| 69 | 03 | B5 | CC | 94 | 02 | B9 | 31 | 223 | 01 | 25 | E2 | 251 | 01 | 05 | 19 |
| 70 | 03 | A8 | 3A | 95 | 02 | B1 | DA | 224 | 01 | 24 | 92 | 252 | 01 | 04 | 10 |
| 71 | 03 | 9B | 0A | 96 | 02 | AA | AA | 225 | 01 | 23 | 45 | 253 | 01 | 03 | 09 |
| 72 | 03 | 8E | 38 | 97 | 02 | A3 | A0 | 226 | 01 | 21 | FB | 254 | 01 | 02 | 04 |
| 73 | 03 | 81 | C0 | 98 | 02 | 9C | BC | 227 | 01 | 20 | B4 | 255 | 01 | 01 | 01 |
| 74 | 03 | 75 | 9F | 99 | 02 | 95 | FA | 228 | 01 | 1F | 70 | 0 | x | x | x |
| 75 | 03 | 69 | D0 | 100 | 02 | 8F | 5C | | | | | | | | |
| 101 | 02 | 88 | DF | 126 | 02 | 08 | 20 | | | | | | | | |
| 102 | 02 | 82 | 82 | 127 | 02 | 04 | 08 | | | | | | | | |
| 103 | 02 | 7C | 45 | 128 | 02 | 00 | 00 | | | | | | | | |
| 104 | 02 | 76 | 27 | 129 | 01 | FC | 07 | | | | | | | | |
| 105 | 02 | 70 | 27 | 130 | 01 | F8 | 1F | | | | | | | | |
| 106 | 02 | 6A | 43 | 131 | 01 | F4 | 46 | | | | | | | | |
| 107 | 02 | 64 | 7C | 132 | 01 | F0 | 7C | | | | | | | | |
| 108 | 02 | 5E | D0 | 133 | 01 | EC | C0 | | | | | | | | |
| 109 | 02 | 59 | 3F | 134 | 01 | E9 | 13 | | | | | | | | |
| 110 | 02 | 53 | C8 | 135 | 01 | E5 | 73 | | | | | | | | |
| 111 | 02 | 4E | 6A | 136 | 01 | E1 | E1 | | | | | | | | |
| 112 | 02 | 49 | 24 | 137 | 01 | DE | 5D | | | | | | | | |
| 113 | 02 | 43 | F6 | 138 | 01 | DA | E6 | | | | | | | | |
| 114 | 02 | 3E | E0 | 139 | 01 | D7 | 7B | | | | | | | | |
| 115 | 02 | 39 | E0 | 140 | 01 | D4 | 1D | | | | | | | | |
| 116 | 02 | 34 | F7 | 141 | 01 | D0 | CB | | | | | | | | |
| 117 | 02 | 30 | 23 | 142 | 01 | CD | 85 | | | | | | | | |
| 118 | 02 | 2B | 63 | 143 | 01 | CA | 4B | | | | | | | | |
| 119 | 02 | 26 | B9 | 144 | 01 | C7 | 1C | | | | | | | | |
| 120 | 02 | 22 | 22 | 145 | 01 | C3 | F8 | | | | | | | | |
| 121 | 02 | 1D | 9E | 146 | 01 | C0 | E0 | | | | | | | | |
| 122 | 02 | 19 | 2E | 147 | 01 | BD | D2 | | | | | | | | |
| 123 | 02 | 14 | D0 | 148 | 01 | BA | CF | | | | | | | | |
| 124 | 02 | 10 | 84 | 149 | 01 | B7 | D6 | | | | | | | | |
| 125 | 02 | 0C | 49 | 150 | 01 | B4 | E8 | | | | | | | | |
| 151 | 01 | B2 | 03 | 176 | 01 | 74 | 5D | | | | | | | | |
| 152 | 01 | AF | 28 | 177 | 01 | 72 | 42 | | | | | | | | |
| 153 | 01 | AC | 57 | 178 | 01 | 70 | 2E | | | | | | | | |
| 154 | 01 | A9 | 8E | 179 | 01 | 6E | 1F | | | | | | | | |

The subsystem simultaneously converts the divisor Y into the corresponding three substrings $g_1, g_2, g_3$. The structure is shown in FIG. 2, which includes three ROM's denoted by ROM1, ROM2, ROM3 have a common address bus 4. All of the ROM1, ROM2, ROM3 are accessed by the same addresses and at the same time. This is a distinctive feature of the subsystem. Further, each ROM has a separate output bus. That is, the output buses 5–7 of each individual ROM are not connected to a common data bus. This is another distinctive feature of the subsystem.

Figure 3:
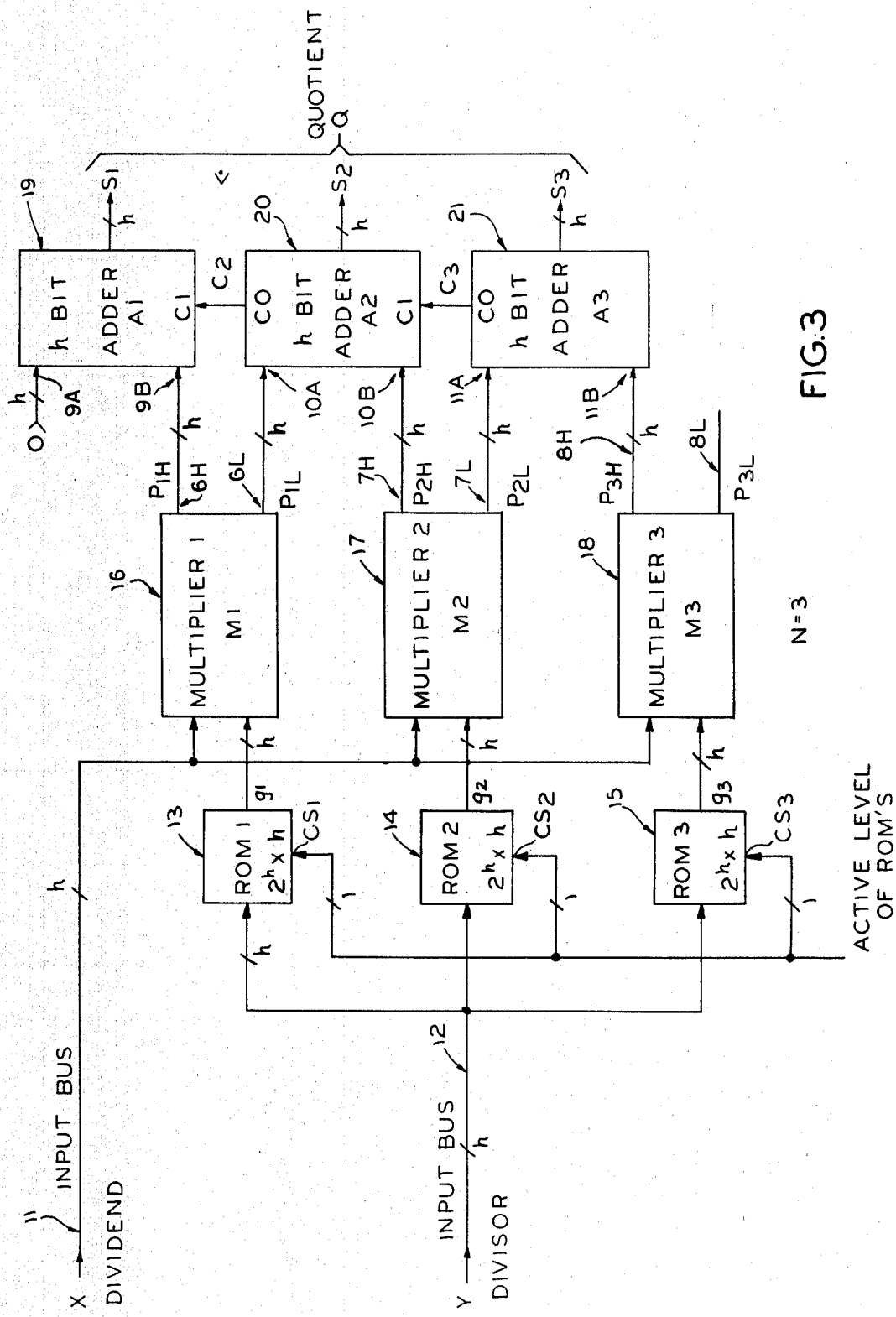
FIG. 3 shows a detailed diagram of a divisor transform type division system.

FIG. 3 shows the preferred embodiment of the invention which is the divisor transform type, high-speed division system with the accuracy index N ($\geq 2$). A division system for N=3 is here illustrated.

The second subsystem (FIG. 3) is simply an N number of independent multipliers 16–18, each having the same structure. Each multiplier is an h-bit-by-h-bit multiplier. An asynchronous multiplier is preferably used as the multiplier, because no clock is required, and tedious timing design problems need not be considered. Further, the high-speed multiplication requires a fast clock rate, which results in a "so-called" bit-drop errors in usual synchronous multipliers.

It is especially appropriate to use the asynchronous multipliers such as "An Exponent Transform Type High-Speed Multiplication System," U.S. patent application Ser. No. 034,145, filed Apr. 27, 1979, and "Dual Moduli Exponent Transform High-Speed Multiplication System," U.S. patent application Ser. No. 152,681, filed May 23, 1980. The application Ser. No. 034,145 uses two exponent-type multipliers, while Ser. No. 152,681 uses a mixed-type multiplier, only one type exponent, and addition modulo of partial products.

The input buses are composed of h-bit lines and are indicated by 11, 12, where line 11 is the input bus for a dividend X of h-bit length, and line 12 is the input bus for a divisor Y of h-bit length. Input bus 12 is used as the common address bus leading to the read-only memories ROM1, ROM2 and ROM3 which are identified by the reference numerals 13, 14, 15.

The divisor transform string is an integer G of an Nh-bit length. The transform string G is divided into the substrings $g_1$, $g_2$, $g_3$, such that $G=g_1g_2g_3$. The ROM's 13, 14, 15 are tailored so that the substrings $g_1$, $g_2$ and $g_3$ are stored in the respective ROM's 13, 14, 15 at the same address which is indicated by a corresponding divisor Y. When a divisor Y is simultaneously applied to the address inputs of the tailored ROM's 13, 14, 15, the separate outputs of the ROM's 13, 14, 15 generate substring $g_1$, $g_2$, $g_3$ simultaneously. They are applied to the corresponding inputs of the respective input multiplier terminals of the h-bit-by-h-bit multipliers M1, M2, M3 which are identified by the reference numerals 16, 17, 18, respectively.

On the other hand, all of the multiplicand terminals of multipliers 16, 17, 18 are commonly connected to the input bus 11 to which a dividend X is applied. The chip select terminals of the ROM's 13, 14, 15 are shown in FIG. 3 by symbols CS1, CS2, CS3. All these terminals must be kept at an active level.

The output terminals of the three multipliers 16, 17, 18 are divided into the respective high and low h-bit lines which are indicated by 6H, 6L; 7H, 7L; 8H, 8L, respectively.

When a dividend X and a divisor Y are applied to the respective input buses 11, 12, the divided products appear on the respective divided output terminals of multipliers 16, 17, 18, such as $P_{1H}$, $P_{1L}$ on 6H, 6L, $P_{2H}$, $P_{2L}$ on 7H, 7L, and $P_{3H}$, $P_{3L}$ on 8H, 8L.

An adders chain is composed of three adders A1, A2, A3 indicated by reference numerals 19, 20, 21. The augend terminals of adders 19, 20, 21 are denoted by 9A, 10A, 11A. The addend terminals of adders 19, 20, 21 are indicated by 9B, 10B, 11B.

The connections between the various circuits are made as shown in FIG. 3. The high multiplier output 6H is connected to adder input 9B. The low multiplier output 6L is connected to adder input 10A. The high multiplier out 7H is connected to adder input 10B. The low multiplier output 7L is connected to adder input 11A. The high multiplier output 8H is connected to adder input 11B. Thus, the connections between the multipliers array and the adders chain are completed.

The adder block carry-in and carry-out terminals of the adders 19, 20, 21 are depicted by the symbols CI, CO, respectively. The adders are interconnected in cascade as shown in FIG. 3.

The sum terminals of adders 19, 20, 21 are indicated by $S_1$, $S_2$, $S_3$. Signals on these terminals are combined to form a final quotient Q, which is given by the complete string of digit signals formed by the sum of the substrings which appear on terminals $S_1$, $S_2$, $S_3$, respectively.

The structural features are explained above for N=3. Each of the three multipliers operate in an independent mode.

The structural feature is that the respective multiplicand terminals of the M1, M2 and M3 are connected in common to the input bus for a dividend denoted by X, which is an h-bit integer.

The input bus is constructed by h lines carrying the respective digits of the dividend X.

Another structural feature is that the respective multiplier terminals of the ROM's M1, M2 and M3 are separately connected to the respective output buses. Therefore, the respective multipler terminals are supplied with the respective substrings $g_1$, $g_2$ and $g_3$ of the divisor transform string G, when a divisor Y is applied to the input bus for the divisor.

One other structural feature is that the respective output terminals of the multipliers M1, M2 and M3 are partitioned into high and low h-digit lines. The total digit line number of the respective output terminal is equal to 2h. This partitioning is made by merely pulling out the separate output lines.

Let the respective products of the multipliers M1, M2 and M3 be $P_1$, $P_2$ and $P_3$, and let the respective high and low product, h-digit substrings of them be $P_{1H}$, $P_{1L}$; $P_{2H}$, $P_{2L}$; and $P_{3H}$, $P_{3L}$. Then, these product substrings appear on the respective partitioned output terminals of the multipliers M1, M2 and M3, when a dividend X and a divisor Y are applied to the respective input buses 11, 12, each of which are composed of h-digit lines, respectively.

The multiplications performed in the respective multipliers are such that the dividend X is multiplied by substring $g_1$, $g_2$ and $g_3$ in the respective multipliers M1, M2 and M3. The formal representation is given by equation (22).

After the application of the dividend and the divisor, the time required for obtaining these product substrings is almost the same, because the component devices of the first and the second subsystems are connected in parallel, where necessary, and are operated concurrently.

The third subsystem is constructed by an adder chain 19-21, which is the final subsystem of the preferred embodiment of the invented division system. The number of the adders is equal to the accuracy index N. Each adder is an h-bit adder. When two h-bit integers are applied to its augend and addend terminals, respectively, the adders perform the summation modulo $2^h$. That is, an h-bit addition, including a carry-in bit, is applied to the adder's carry-in terminal, which also provides a carry-out terminal for the overflow carry bit.

Currently, one of the most popular, commercially available binary adders is type SN74283 (4-bit full adder, Texas Instruments). When h=8, two SN74283-s are used in cascade.

The structural feature is that the carry-in, carry-out terminals of the three adders A1, A2 and A3 are connected in a cascaded chain. That is, in the chain, the carry-in terminal of adder A2 is connected to the carry-out terminal of adder A3. The carry-out terminal of adder A2 is connected to the carry-in terminal of adder A1. The carry-out terminal of adder A1 and the carry-in terminal of adder A3 are not connected. The adder A1 gives the h-digit integer portion of the quotient, and the adders A2, A3 give the 2h digits fraction portion of the quotient, which is correct in the digits fraction portion of the quotient, which is correct in the digits provided.

Another distinctive feature of the adder chain is that the adder A1, which is located at the top of the chain, does not receive the most significant digit. The augend and the addend terminals of the adders A2, A3 are connected to the respective low- and high-bit line portions of the output terminals of the consecutive multipliers. More precisely, the low h-bit line portion of the output of the multiplier M1 and the high h-bit line portion of the output of the multiplier M2 are connected to the augend and the addend terminals of the adder A2, respectively. The low h-bit line portion of the multiplier M2 and the high h-bit line portion of the output of the multiplier M3 are connected to the augend and the addend terminals of the adder A3. The augend terminal of the adder A1 is held at a potential which is as if all signals received there are 0's bits. The addend terminal of adder A1 is connected to the high bit line portion $P_{1H}$ of the output of the multiplier M1.

While the connecting relationships may seem complicated in this verbal descriptions, they are actually a simple connection, as can be observed in FIG. 3, which is the preferred embodiment of the invention.

The third subsystems 19-21 is connected to the second subsystem, to perform the additions illustrated in FIG. 1 and indicated in the equation (18), when a dividend X and a divisor Y are applied to the respective input buses.

The respective sum bits mod $2^h$ (say, $S_1$, $S_2$, $S_3$) on the sum terminals of the respective adders A1, A2 and A3 appear when such additions are performed at the adders in the chain. These signals appear as shown in the equation (18).

The array of sums $S_1S_2S_3$ gives the quotient Q, which is correct up to the Nh fraction bit position.

Therefore, for an accuracy index of N=3, the quotient Q is correct up to 3 h fraction bit position given by:

$$Q = S_1 S_2 S_3$$

The fixed decimal point can be assigned between the sum digits $S_1$ and $S_2$, for example.

Consequently, a fast division, with the accuracy index N, is automatically for an h-digit dividend and an h-digit divisor in an asynchronous mode of operation.

As explained heretofore, the divisor transform type high-speed division system is the preferred embodiment of the invention. It has distinctive features in structure, specifications and operation.

The distinctive structural feature is the simplicity of its structure that comprises the divisor transform ROM's, multipliers and adders and, further, the ingenuity of its connecting circuitry that makes the component devices a most efficient entity.

The accuracy of the quotient for a dividend and a divisor (both of h-bit number) can be specified by the accuracy index N.

This feature is very convenient for many division applications.

The total operation of this division system, as can be seen from the explanations heretofore. It is asynchronous and fast, if the multipliers operate asynchronously. The usage of such multipliers is preferable, as mentioned previously. The speed of the division system can be estimated by the sum of the divisor transform ROM's access time, say, $T_{rom}$, the multiplication time of the multipliers, say, $T_{mp}$, and the adders chain delay time, say, $T_{ad}$. Then, the total time $t_{dv}$ required to complete a division problem can be written as:

$$T_{dv} = T_{rom} + T_{mp} + T_{ad} \tag{26}$$

For instance, using PROM's such as type SN74S471 (256 word, access time 50 ns, Texas Instruments) for the divisor transform, $T_{rom}$ is equal to 50 ns, assuming $T_{mp}=100$ ns, $T_{ad}=50$ ns, h=8; then, $T_{dv}$ is given as 200 ns. These speeds are approximate; nevertheless, the total combined speed is very much faster than the speed of conventional divisors.

A manual calculation may be explained as a follow-up to the explanation of the automatic computation performed in the electronic machine.

AN EXAMPLE: DIVIDE 235 BY 13 (10)

The dividend X=235 (10), the divisor Y=13 (10). The parenthetical number (10) indicates that the preceding number is represented in a decimal form. The parenthetical letter (H) indicates the preceding number is in a hexadecimal form. In this case, h=8, N=3. Then, from Table 1, the divisor transform string G is read as 13B13B (H), the substrings are read as $g_1=13$ (H), $g_2=B1$(H), $g_3=3B$(H). Prior to the manufacture of the system, these substrings are stored in the respective transform ROM's, at the address of Y=13(10)=0D(H)=00001101 (2).

Then, the multiplications follows:

$$P_1 = X \times g_1 = X \times 13(H) = 235 \times 19(10) = 4465(10) = 1171(H).$$

The partitioned products: $P_{1H}=11$(H), $P_{1L}=71$(H).

$$P_2 = X \times g_2 = X \times B1(H) = 235 \times 177(10) = 41595(10) = A27B(H).$$

The partitioned products: $P_{2H}=A2$(H), $P_{2L}=7B$(H).

$$P_3 = X \times g_3 = X \times 3B(H) = 235 \times 59(10) = 13865(10) = 3629(H).$$

The partitioned products: $P_{3H}=36$, $P_{3L}=29$(H).

Next, the summations follow:

$$S_3 = P_{2L} + P_{3H} (\text{mod } 256) = 7B(H) + 36(H) = B1(H),$$

no carry-out $c_3=0$.

$$S_2 = P_{1L} + P_{2H} (\text{mod } 256) = 71(H) + A2(H) = 13(H),$$

carry-out $c_2=1$.

$$S_1 = P_{1H} + c_2 (\text{mod } 256) = 11(H) + 01(H) = 12(H).$$

Therefore, the quotient is given as:

$$Q = S_1.S_2S_3 = 12.13B1(H) = 00010010.000100111011\,0001$$

which is correct as far as the digits presented are concerned. The quotient Q is 18.0769194 in decimal form. The direct manual calculation of 235/13 gives 18.076923 . . . . If more accuracy is required, the selected accuracy index N should be larger than 3.

THE SEQUENTIAL HIGH-SPEED DIVISION SYSTEM

This clock-controlled system (FIG. 4) is another embodiment of the invention. The basic processes performed in the system are the same. However, the operations are performed in sequence, so that only one multiplier is required. The number of sequences required to complete the division is equal to the accuracy index N. From the structural point of view, the number of the divisor transform ROM's and the number of the adders in the chain are also equal to the accuracy index N, as before.

Figure 4:
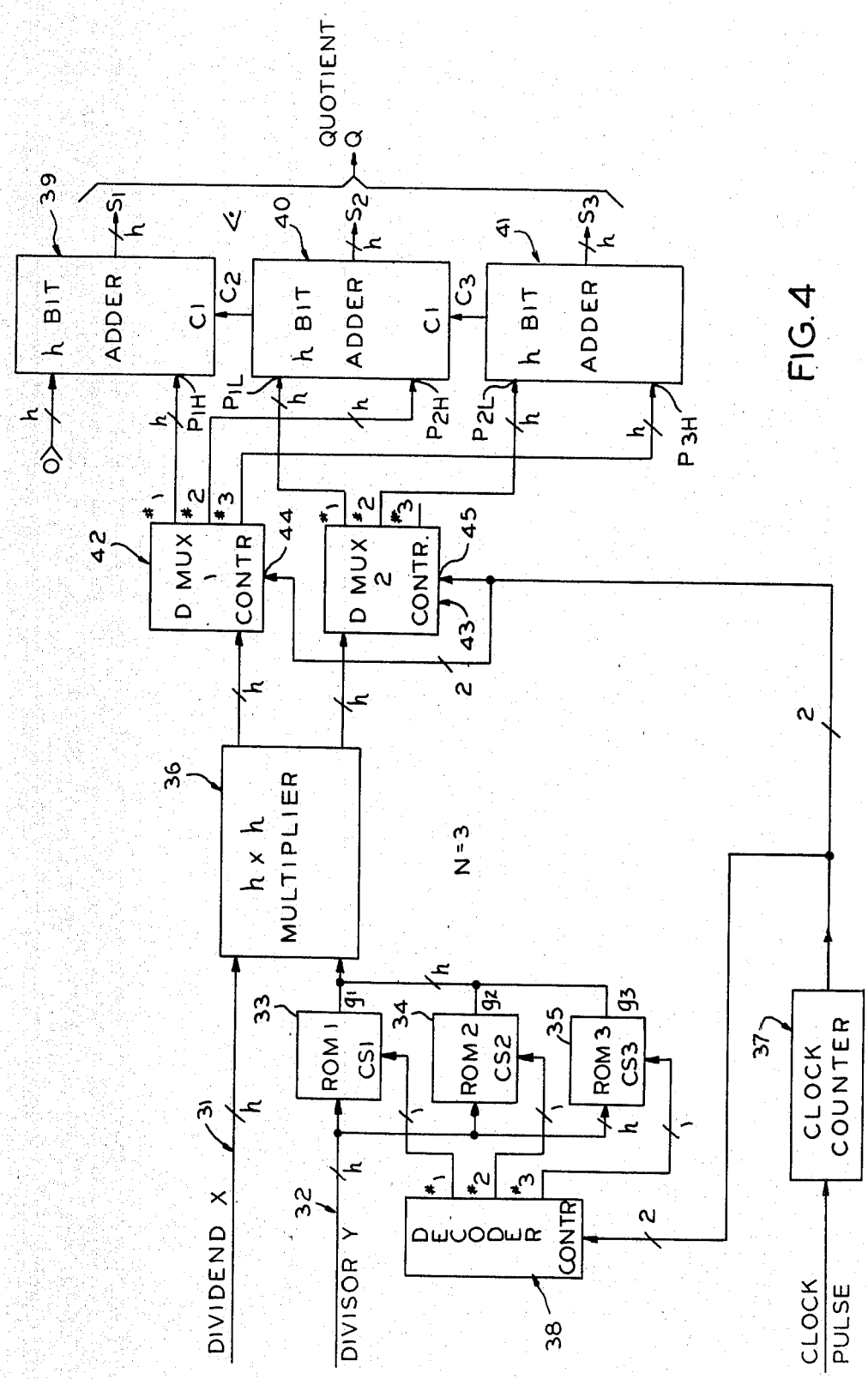
FIG. 4 shows a detailed block diagram of a sequential divisor transform type of division system.

FIG. 4 shows the detailed block diagram of the present division system which is operated in sequence. Again, an accuracy index N is assumed to be 3, for simplicity. A dividend X and a divisor Y are integers in the binary form, each having an h-bit length.

In FIG. 4, a dividend X is applied to one of the input buses 31, which is connected to the multiplicand terminal of a multiplier 36.

A divisor Y is applied to another one of the input buses 32, which is commonly connected to the address buses of the three ROM's, that is, ROM1, ROM2 and ROM3, 33, 34, 35. These ROM's must be tailored to store the substrings $g_1$, $g_2$, $g_3$ at the address identified by the corresponding divisor Y.

The respective output buses 33, 34, 35 are commonly connected to the multiplier terminal of the multiplier 36. The above-mentioned connection of the output buses of 33, 34, 35 differs from that of the previous embodiment of the invention.

The control circuitry must be added to the structure of FIG. 4, because it operates sequentially. The first control unit is a clock counter 37 which operates on a scale of 4 in the example of N=3, that is, the binary counter scale of 4 which is a prevailing type of IC unit. A source of clock pulses is applied to counter 37 for controlling the division system. As a clock pulse counting proceeds, the two output bit lines consecutively have the signals 0,0; 1,0; 0,1; 1,1; 0,0; and so on (or, it could be the reverse order, that is, 1,1; 1,0; 0,1; 0,0; 1,1; and so on). These output lines are connected to the control terminal of the decoder 38, which is a second control circuit.

The three output lines of the decoder 38 are connected to the respective chip select terminals CS1, CS2, CS3 of the three ROM's 33, 34, 35. These terminal selections are controlled by the bit signals which clock counter 37 applies to the control terminal of decoder 38. In the decoder 38, only one of the output lines can be activated at any given time, thus leaving the other output lines inactive, according to the control bit pattern of the decoder 38 control terminals.

Therefore, only of the three ROM's 33–35 can be activated to enable the corresponding substring of output pulses to issue on the output common bus which is connected to the multiplier 36, according to the bit pattern of clock counter 7 or of signals on the control terminal of decoder 38.

The structure of FIG. 4 performs the multiplication sequence under the control of clock pulses counted at 37, when a dividend and a divisor are applied to buses 31, 32. The clock pulse counter 37 controls the three-device decoder 38, and demultiplexers 42, 43.

*This sequence is:*

(a) clock pulse #1 changes the counter 37 output to "11." Then, the #3 output line of the decoder 38 is selected in order to activate ROM 35, which generates the substring $g_3$. Multiplier 36 multiplies $X \times g_3$, thereby producing the product $P_3$ ($P_{3H}P_{3L}$).

(b) clock pulse #2 changes the counter 37 output to "10." Then, the output #2 line of decoder 38 is selected in order to activate ROM 34, which generates the substring $g_2$. Multiplier 36 multiplies $X \times g_2$, thereby producing the product $P_2$ ($P_{2H}P_{2L}$).

(c) clock pulse #3 changes the counter 37 output to "01." Then, the output #1 line of decoder 38 is selected in order to activate ROM 33, which generates the substring $g_1$. Multiplier 36 multiplies $X \times g_1$, thereby producing the product $P_1$ ($P_{1H}$, $P_{1L}$).

(d) clock pulse #4 changes the counter 37 output to "00." that is, the counter is cleared. The division system enters into a waiting state, awaiting the next starting clock pulse (clock pulse #1) for making the next division calculation.

Further, the control units are required to cause the high and low portions of the products to appear on the outputs of the multiplier 36. These two product portions are applied to the appropriate augend and addend terminals of the three adders 39, 40, 41, in the chain.

This division into high and low product portions is performed by two demultiplexers 42, 43 which are controlled responsive to the clock pulse output of the counter 37. The demultiplexer 42 is connected to the high portion of the bit lines in the output terminal of the multiplier 36, while the demultiplexer 43 is connected to the low portion of these lines. Each of the demultiplexers 42,43 has three output buses marked #1, #2 and #3. The terminals 44, 45 are the respective control terminals for demultiplexers 42, 43 to which the output lines of the clock counter 37 are connected. The connections between the demultiplexers 42, 43 and the adders 39, 40, 41 are shown in FIG. 4 and are the same as the high and low subproduct connections which are described above in connection with FIG. 3. The quotient Q is obtained on the sum terminals in the sequence of the low- to high-digit order.

Accordingly, since the bit pattern on the control terminal 44 is "11," "10," and "01," the demultiplexer 12 delivers the high-bit half output portions of the multiplier 36 to the output buses denoted by #3, #2, and #1, respectively.

The demultiplexer 43 implements the same operations, except that its input bus is connected to the low-bit half portion of the output terminals of the multiplier 36.

Therefore, the structure performs a division in a sequence, under the control of the clock pulses, when a dividend and a divisor are applied to the input buses 31, 32.

The sequence is performed by following to the same sequence that had been described previously:

(a) clock pulse #1 changes the counter 37 output to "11," which is applied to the demultiplexer control terminals 44, 45. Then, the #3 buses of the demultiplexers 42, 43 are connected to the respective high and low portions of the output terminal of the multiplier 36. In FIG. 4, high portion terminals $P_{3H}$ are applied to the augend terminal of the adder 41.

(b) clock pulse #2 changes the counter 37 output to "10," which is applied to demultiplexer control terminals 44, 45. Then, the #2 buses of demultiplexers 42, 43 are connected to the respective high and low portions of the output of multiplier 36. The inputs $P_{2L}$ are applied to the addend terminal of the adder 41. The automatic addition is performed, thus providing a sum $S_3$ on the sum terminal of 41, generating a carry-out signal $c_3$, if any. The higher portion $P_{2H}$ is applied to the augend terminal of the adder 40.

(c) clock pulse #3 changes the counter 37 output to "01," which is applied to demultiplexer control terminals 44, 45. Then, the #1 buses of demultiplexers 42, 43 are connected to the respective high and low portions of the output of multipliers 36. The low product portion $P_{1L}$ is applied to th addend terminal of the adder 40. Thus, the automatic addition is performed, thereby providing a sum $S_2$ on the sum terminal of adder 40, and generating a carry-out signal $c_2$, if any. The high product portion $P_{1H}$ is applied to the addend terminal of the adder 39. Its augend terminal is always held at "0." The automatic addition is performed considering the carry at the terminal $c_2$, if any, and providing a sum $S_1$ on the sum terminal of the adder 39. Therefore, a quotient Q is obtained as the array $S_1$, $S_2$ and $S_3$; or, in other words, as the string $S_1S_2S_3$, wherein the decimal point is assumed to be located between the $S_1$ and $S_2$ outputs of adders 39, 40.

(d) clock pulse #4 changes the counter 37 output to "00," thus returning the system to normal, awaiting receipt of the next division problem.

In a sequential high-speed division system, the adders 39–41 must be of the latched-gate type, when the adder is full, in order to avoid the bit delay on the terminals of the adder. The datum is not applied concurrently to the augend and addend terminals of the adder.

The period of the clock pulses, say, $T_{ck}$, is determined in the following manner. In a sequential division system, the first step is to select one of the divisor transform ROM's 33–35 by activating one of the chip select lines (marked CS1-CS3). The time required to select a chip is called "chip select time," say, $T_{cs}$. Other delay times $T_{rom}$, $T_{mp}$ are same as explained before, except the adders delay time in this case is much smaller than the previous adder delay time, because the addition occurs only once during one clock period, say, $T_{ad}'$.

Therefore, the total elapsed time required to complete the process after the application of the first clock pulse is given by $$T_{cs} + T_{rom} + T_{mp} + T_{ad}' = T$$

It is clear that the clock period $T_{ck}$ must be larger than T, so that the following relationship may exist:

$$T_{ck} > T_{cs} + T_{rom} + T_{mp} + T_{ad}' \tag{27}$$

For instance, $T_{cs}$=20 ns, $T_{rom}$=50 ns, $T_{mp}$=100 ns, $T_{ad}'$=20 ns, then $T_{ck}$ may be approximately 250 ns.

Therefore, the division time $T_{dv}$ for the clock period $T_{ck}$ and the accuracy index N is given by:

$$T_{dv} = N \times T_{ck} \tag{28}$$

For instance, if $T_{ck}$=250 ns and N=3, then $T_{dv}$=750 ns.

The sequential high-speed division system by the inventive divisor transform system provides a quotient having fraction bits which are correct up to the Nh fraction bit position, counting in the sequence from the least significant h-bit portion. When a dividend (of h-bit length integers) are applied to their input buses, respectively.

The accuracy index N assures the degree of the accuracy of the quotient given, and also it determines the number of the devices required in the division system.

The system comprises a number N of divisor transform ROM's, a multiplier, and an adder chain constructed from N adders and, further, a control circuitry for sequentially obtaining the quotient, by using the multiplier repeatedly.

The ROM's are tailored by storing the respective substrings at the addresses of the divisors. These ROM's are then combined into an array of structures such that each address bus of the ROM's is commonly connected to the input bus 32 for the divisor. Each output data bus of the ROM's 33–35 is commonly connected to the multiplier terminal of the multiplier 36. Each chip select terminal CS1-CS3 of the ROM's 33–35 is connected to one of N output lines of a decoder, respectively.

The multiplier 36 is an h-bit-by-h-bit multiplier. Its multiplicand terminal is always connected to the input bus 31 for the dividend, and its multiplier terminal is connected to the output buses of the ROM's, in this sequential division system.

The output terminals of the multiplier 36 are separated into the high and low h-bit portion lines and applied to two demultiplexers 42, 43, as their input buses. Responsive to the control bit pattern, each demultiplexer 42, 43 has N output buses and can select one of them to be connected to the input bus, thus leaving other buses unconnected.

The adder chain 39–41 is constructed from N adders connected to each other, in cascade. The augend and addend terminals of the adders are interlaced to the output buses #1, #2, #3 of the two demultiplexers 42, 43. When a dividend and a divisor are applied, the j th adder gives the (j−1)th fraction, h bits of the quotient at its sum terminal during the m th clock time, wherein $m = N - j + 2$.

The control circuitry comprises a clock counter 37, a decoder 38, and two demultiplexers. When the m clock pulse is applied, the counter 37 issues a signal to the decoder 38 and the demultiplexers 42, 43. Responsive thereto, the N−m+1 th ROM generates the substring $g_{N-m+1} = g_{j+1}$ which is applied to the multiplier 36, thereby generating the product $P_{j+1}$. The product $p_{(j+1)L}$ is supplied by the demultiplexer 36 to the addend terminal of the j th adder. At the time of the m−1 th clock pulse, the demultiplexer applies the product $p_{j+2,H}$ to the augend terminal of the added. At the m th clock pulse time, the addition is performed and the j th adder gives sum bits which are equal to the j−1 th fraction h bits of the quotient, and so on.

Therefore, the sequential division system presented heretofore is a synchronous system in which a quotient is obtained from the least significant h-bit fraction portion, with consecutive operation under the control of clock pulses.

The distinctive feature of the sequential structure (FIG. 4) is that only one multiplier is required because it is used repeatedly. The ingenuity of the array of transform ROM's makes this reduction possible. Only one of the tailored ROM's is selected and it applies the transformed data substring to the multiplier terminal of the multiplier 36 during some clock pulse period. Further, the demultiplexers are located between the multplier 36 and the adder chain 39–41, which also makes is possible to use the multiplier repeatedly.

The distinctive feature of the operation is that the division operation is replaced by repeated multiplications of a dividend and a transformed substring that corresponds to a divisor. The additions of the resulting partitioned products eliminate a need for shift operations which are frequently encountered in the conventional divisors.

Those who are skilled in the art will readily perceive how to modify the system. Therefore, the appended claims are to be construed to cover all equivalent structures which fall within the true scope and spirit of the invention.

I claim:

1. An electronic division system comprising means for transforming an input divisor signal into a given number of integers, said given number being a number selected on a basis of a desired accuracy index, means for separately multiplying each of said given number of transformed divisor signals by a dividend signal to produce said given number of multiplication products, and means comprising said given number of adders for adding at least some of the products of said multiplication to produce a quotient signal which is equal to a quotient of said dividend divided by said divisor.

2. The division system of claim 1 and means of separating said multiplication product signals into high and low subproduct signals, means for shifting said products so that a high subproduct signals from one multiplication product is added in said adding means to a low subproduct signal from another multiplication product.

3. The division system of claim 2 and means for discarding at least one of said subproduct signals at the least significant end of said quotient signal, said discarded signals being determined by the given number which is selected as an accuracy index.

4. The division system of any one of the claims 1–3 wherein said transforming means comprises read-only memories, there being a separate read-only memory means for each of said given number of integers.

5. The division system of claim 4 and means for simultaneously applying said divisor signal to all of said read-only memory means.

6. The division system of claim 5 and means for selecting between said read-only memory means.

7. The division system of claim 4 wherein each of said given number of multiplication products is an integer signal sent in parallel over a plurality of wires, said wires being divided into high and low groups of wires, and means for connecting a high group of wires carrying one of said integers to one of said adders and a low group of wires carrying the same one of said integers to another of said adders.

8. The division system of claim 7 and means for interconnecting said adders in cascade to transfer signals between them which cause said adders to align their output signals according to the needs of said quotient signals.

9. The division system of claim 4 wherein there are a plurality of said multiplying means, said plurality being equal to said given number, and means for connecting an output from each of said transforming means to an input of an individually associated one of said separate multiplying means.

10. The division system of claim 4 wherein there is one of said multiplying means, and clock means for sequentially enabling said multiplying means to sequentially make said separate multiplications of each of said transformed divisor signals by said dividend signals.

11. The division system of claim 10 and demultiplex means responsive to said clock means for applying subproducts of said separate multiplications to said adders for adding said multiplication products in a sequence corresponding to said quotient.

12. The division system of claim 11 and means for interconnecting said adders in cascade to transfer signals between them which cause said adders to align their output signals according to the needs of said quotient signals.

13. An electronic division network for dividing a dividened by a divisor to produce a quotient having an accuracy fixed by an accuracy index, said accuracy index being determined by a selected one (N) of a plurality of numbers, a plurality equal to N of read-only memory means having a common input carrying signals representing said divisor, said divisor being an address signal for each of said memory means, each of said read-only memory means storing a predetermined substring of digits at each divisor signal address signal which can appear at said common input, a plurality equal to N of multiplication means having a common input carrying a signal representing said dividend, each of said multiplication means being individually associated with a corresponding one of said read-only memories, whereby each of said N multiplication means concurrently receives a corresponding one of said substring of digits and a dividend appearing at the common input of said multiplication means, means responsive to a multiplication product from each of said multiplication means for producing 2 N subproduct of strings of digits, a plurality equal to N of adding means connected in cascade for adding said subproducts to produce a quotient signal, a signal on said cascade connection shifting said additions to produce a quotient, and means for inserting a decimal point between the outputs of preselected ones of said adding means.

14. The network of claim 13 wherein said dividend and divisor are expressed in terms of h-bit length binary words, each of said multiplication means being an h-by-h-bit multiplier.

15. The network of claim 14 and means for selectively eliminating at least one of said subproduct strings responsive to said accuracy index.

16. An electronic division network for dividing a dividend by a divisor to produce a quotient having an accuracy fixed by an accuracy index, said accuracy index being determined by a selected one (N) of a plurality of numbers, N read-only memory means having a common input for receiving signals representing said divisor, address signals of said memory means being expressed in terms of said divisor signals, each of said read-only memory means storing a predetermined subtransform of part of said divisor at each address signal which can appear at said common input, multiplier means having an input for receiving signals representing said dividend, clock means for successively applying each part of said transformed divisor to said multiplier means whereby said multiplier means successively receives strings of digits selected from said read-only memory means responsive to said divisor signals, said multiplier means successively multiplying each successive string by a dividend signal appearing at the input of said multiplier means, means responsive to said successive multiplication products from each of said successive multiplications for producing 2 N subproduct strings of digits, a plurality of adding means having carry terminals connected in cascade, demultiplexer means for applying each of the 2 N subproducts to selected ones of said adding means for adding said subproducts with digital shifts signalled at said carry terminals to produce a quotient signal.

17. The network of claim 16 and means for inserting a decimal point between the outputs of preselected ones of said adding means.

* * * * *

UNITED STATES PATENT AND TRADEMARK OFFICE
CERTIFICATE OF CORRECTION

PATENT NO. : 4,374,427
DATED : February 15, 1983
INVENTOR(S) : Aisuke Katayama

It is certified that error appears in the above—identified patent and that said Letters Patent is hereby corrected as shown below:

Col. 3, line 36, "$b_1m$" should be --$b_{-m}$--;

Col. 14, Line 3, "tdv" should be --$T_{dv}$--;

Col. 15, Line 41, "1,1; 0,0;" should be --0,0; 1,1;--;

Col. 17, Line 10, "th" should be --the--;

Col. 18, Line 45, "P(j+1)L" should be --$P_j + {}_1L$--;

Col. 18, Line 48, "added" should be --adder--.

Claim 2, Line 1, "of" should be --for--.

Signed and Sealed this

Fifth Day of July 1983

[SEAL]

Attest:

GERALD J. MOSSINGHOFF

Attesting Officer

Commissioner of Patents and Trademarks